(12) United States Patent
Djukic et al.

(10) Patent No.: US 9,980,284 B2
(45) Date of Patent: May 22, 2018

(54) CONTENTION-BASED RESERVATIONS OF NETWORK RESOURCES

(71) Applicant: Huawei Technologies Co., LTD, Guangdong (CN)

(72) Inventors: Petar Djukic, Ottawa (CA); Amine Maaref, Ottawa (CA)

(73) Assignee: Huawei Technologies Co., LTD., Shenzhen (CN)

( * ) Notice: Subject to any disclaimer, the term of this patent is extended or adjusted under 35 U.S.C. 154(b) by 125 days.

(21) Appl. No.: 14/657,551

(22) Filed: Mar. 13, 2015

(65) Prior Publication Data

US 2016/0270119 A1 Sep. 15, 2016

(51) Int. Cl.
*H04W 74/02* (2009.01)
*H04W 74/08* (2009.01)

(52) U.S. Cl.
CPC ........ *H04W 74/02* (2013.01); *H04W 74/0808* (2013.01)

(58) Field of Classification Search
CPC . H04W 74/08; H04W 72/0446; H04W 74/02; H04W 74/0808
See application file for complete search history.

(56) References Cited

U.S. PATENT DOCUMENTS

| | | | | |
|---|---|---|---|---|
| 5,677,909 A * | 10/1997 | Heide | ................. | H04B 10/1125 370/347 |
| 6,529,520 B1 * | 3/2003 | Lee | ..................... | H04L 12/5602 370/442 |
| 8,422,481 B2 * | 4/2013 | Hanuni | ............. | H04W 72/0406 370/348 |
| 2004/0160930 A1 * | 8/2004 | Choi | ....................... | H04L 29/06 370/338 |
| 2009/0219876 A1 * | 9/2009 | Kimura | ............. | H04W 72/1247 370/329 |
| 2009/0232103 A1 * | 9/2009 | Kesselman | ............... | H01Q 3/26 370/336 |
| 2011/0007720 A1 * | 1/2011 | Shimizu | ................ | H04W 74/02 370/336 |
| 2012/0063305 A1 | 3/2012 | Chiu et al. | | |
| 2012/0196608 A1 | 8/2012 | Ting et al. | | |
| 2012/0220325 A1 | 8/2012 | Zhou et al. | | |
| 2012/0231828 A1 | 9/2012 | Wang et al. | | |
| 2013/0053084 A1 | 2/2013 | Cho et al. | | |
| 2013/0114494 A1 | 5/2013 | Yuk et al. | | |
| 2013/0121275 A1 | 5/2013 | Park et al. | | |
| 2013/0166839 A1 * | 6/2013 | Burton | .................. | G06F 3/0611 711/114 |

(Continued)

FOREIGN PATENT DOCUMENTS

CN 102651853 A 8/2012
WO 2014191052 A1 12/2014

*Primary Examiner* — Christopher Grey
(74) *Attorney, Agent, or Firm* — Slater Matsil, LLP

(57) ABSTRACT

In a wireless (e.g., machine-to-machine) network, items of user equipment compete for wireless communication resource slots ("resources"). In a contention period, an item of user equipment (a UE) sends a first signal to a base station using a first resource. The first resource is mapped to a second resource in a data transmission period. If the base station successfully receives the first signal, it sends a second signal to the UE to confirm that the UE has been awarded the second resource and can transmit data in the data transmission period.

22 Claims, 6 Drawing Sheets

(56) References Cited

U.S. PATENT DOCUMENTS

| | | | | |
|---|---|---|---|---|
| 2015/0010179 A1* | 1/2015 | Solum | ............... | H04R 25/558 |
| | | | | 381/315 |
| 2015/0264132 A1* | 9/2015 | Dang | ............... | H04L 51/38 |
| | | | | 709/206 |
| 2015/0382365 A1* | 12/2015 | Li | ............... | H04L 5/0085 |
| | | | | 370/329 |
| 2016/0044724 A1* | 2/2016 | Seo | ............... | H04W 74/0833 |
| | | | | 370/329 |
| 2016/0112824 A1 | 4/2016 | Tuset et al. | | |

* cited by examiner

CONTENTION-BASED RESERVATIONS OF NETWORK RESOURCES

BACKGROUND

The term "user equipment" (UE) is often used to refer to terminals, such as wireless connected handsets. In the context of the following discussion, machine-to-machine (M2M) terminal devices will be considered as UEs despite the fact that a user may not typically directly interact with them. An M2M network typically includes a large number of UEs that send relatively small amounts of traffic over wireless networks to other devices. For example, a UE installed on a vending machine can periodically report inventory to a centralized server operated by a supplier so that the supplier knows whether the vending machine needs to be restocked.

The UEs communicate with a base station using wireless communication resource blocks or slots (a "resource"). A resource may be shared in the frequency, time, code, and/or space dimension. As UEs proliferate, the amount of M2M traffic will increase. With the increase in M2M traffic, competition between UEs for resources will increase, resulting in congestion and access delays. Thus, a protocol that can more efficiently handle M2M traffic is needed.

More specifically, a conventional M2M network may use a dedicated gateway with custom MAC (media access control) protocols to access a wireless (e.g., cellular) network. The gateway is connected using cellular technology such as 3G ("third generation") or LTE (Long Term Evolution).

However, it may not be practical to adapt a cellular network to schedule accesses or to manage resource reservation requests for M2M traffic. For one thing, the amount of overhead associated with scheduling or reserving resources may be too high, especially as the number of UEs in an M2M network continues to grow. For another, the process of scheduling or reserving resources may take too long to complete for more urgent M2M traffic, such as vehicle-to-infrastructure safety notifications.

A random access or contention-based protocol such as one based on IEEE (Institute of Electrical and Electronics Engineers) 802.11 specifications addresses the overhead issue by reducing the amount of signaling needed to gain access to a resource. However, while this works well for localized M2M networks, it does not scale-up well as network sizes increase.

Also, conventional random access MAC protocols are not particularly well-suited for cellular networks. Cellular networks are slotted systems; transmissions start and end in the same slot (e.g., a time/frequency slot). This precludes the use of protocols such as CSMA (Carrier Sense Multiple Access) to detect and avoid collisions between UEs attempting to use the same resource. When a collision occurs between UEs, the contested resource goes unused; at the same time, other resources might be available but also go unused. As a consequence, under a protocol such as CSMA, resources are not efficiently utilized. For example, the best channel utilization experienced to date is on the order of 38 percent, achieved using the ALOHA protocol.

Furthermore, it is both difficult and inefficient to allocate resources for M2M random or contention-based accesses because UEs may not be transmitting on a predictable schedule. UEs are typically battery-powered, and hence may be in sleep mode for extended periods of time to conserve power. A resource could be allocated permanently to a UE to ensure that the UE can transmit whenever it is ready, e.g., right after it wakes up. To make efficient use of resources, the permanently allocated resources would have to be small, but that might mean the permanently allocated resources are not large enough to accommodate transmission of all of the UE's data. It would be difficult to determine how large a resource should be in order to ensure low latency and high network efficiency. Also, because there may be more UEs than available resources, some UEs would have to be allocated the same resource. Thus, collisions can still occur if a large number of UEs are awake at the same time.

Therefore, as mentioned above, a protocol that can more efficiently handle M2M traffic would be valuable.

SUMMARY

In overview, in embodiments according to the present disclosure, a random access protocol is provided that enables collision detection in wireless networks (e.g., cellular-based M2M networks) and that schedules resources to avoid collisions. The protocol works in two phases: a contention period, or first phase; and a data period, or second phase. Each contention period is followed by a data period, and each data period is followed by a contention period. A base station (BS) announces the beginning and the end of each contention period and each data period.

Resource slots or blocks in the contention period are referred to as contention resources and as confirmation resources, and resource slots or blocks in the data period are referred to as data resources. Contention resources are used by UEs to contend for data resources. Confirmation resources are used by the BS to confirm which UE has been awarded a particular data resource. Data resources are used by UEs to transmit data. Each contention resource is mapped to one or more data resources in the following data period. A resource may be shared in the frequency, time, code, and/or space dimension.

In a contention period, UEs compete for and are able to, in essence, reserve one or more data resources. In the data period following that contention period, UEs use the data resource(s) reserved in the contention period.

For example, if only a single UE uses a particular contention resource in a contention period, then there is no collision with another contention signal from another UE, and so the first UE can send a contention signal to a BS using that contention resource. In response to receiving that contention signal, the BS will send a confirmation signal to the UE. If the UE receives a confirmation signal from the BS, then the UE can transmit its data using the data resource that was mapped from the contention resource used by the UE. In this manner, the UE is effectively granted a reservation for that data resource. On the other hand, if two or more UEs attempt to use the same contention resource to send respective contention signals to the BS, a collision will occur. Because the BS is typically not able to property decode the overlapping UE contention signals, if the BS cannot identify a contending UE, it cannot respond with a confirmation signal. Thus, none of the contending UEs is granted a reservation for the data resource mapped from the contention resource that was used by those UEs and will not transmit data using that data resource, thereby avoiding collisions in the data period.

In an embodiment, before a first time interval (a contention period) expires, a UE transmits a first signal (a contention signal) to the BS. The first signal is transmitted in a first wireless communication resource (a contention resource) that is mapped to a second wireless communication resource (a data resource) in a second time interval (a data period)

that begins after the first time interval expires. In an embodiment, the BS announces the contention resources, and the UE chooses one of the contention resources (e.g., randomly).

The UE waits for a second signal (a confirmation signal) from the BS in response to the first signal. In an embodiment, the second signal is sent in a wireless communication resource (a confirmation resource) in the first time interval. The UE can transmit data in the second wireless communication resource (the data resource) conditioned on the UE receiving the second signal (the confirmation signal); if the second signal is not received, then the data is not transmitted by the UE in the second wireless communication resource. In other words, the UE recognizes that it has been awarded the second wireless communication resource and can transmit data in the second wireless communication resource in response to receipt of a second signal indicating the award of the second wireless communication resource. In an embodiment, the second signal includes information that specifically identifies the UE that has been awarded the second wireless communication resource.

In an embodiment, if the second signal is not received before the first time interval expires, then the UE can send a third signal (another contention signal) in another (e.g., third) wireless communication resource (another contention resource) in the first time interval; the other contention resource is mapped to another (e.g., fourth) wireless communication resource (another data resource) in the second time interval. The UE recognizes that it has been awarded the fourth wireless communication resource and can transmit data in the fourth wireless communication resource in response to receipt of a fourth signal indicating the award of the fourth wireless communication resource. If the UE is not successful at reserving a data resource during the first time interval, then it can try again in a third time interval (another contention period) following the second time interval.

Embodiments according to the present disclosure provide a number of benefits and advantages. For example, because contention resources are mapped to data resources a priori, a scheduling grant is not needed in order to tell each UE which resource to use for data transmission. Unused data resources can be reassigned to scheduled traffic. Also, the BS can adjust the number of resources in the contention and data periods, and can change the length of those periods, based on load; for example, the BS can reduce the number of contention resources if it detects that the network is underutilized. These features reduce the amount of control traffic/overhead and increase network efficiency, which will be of tremendous benefit as M2M networks grow in size.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
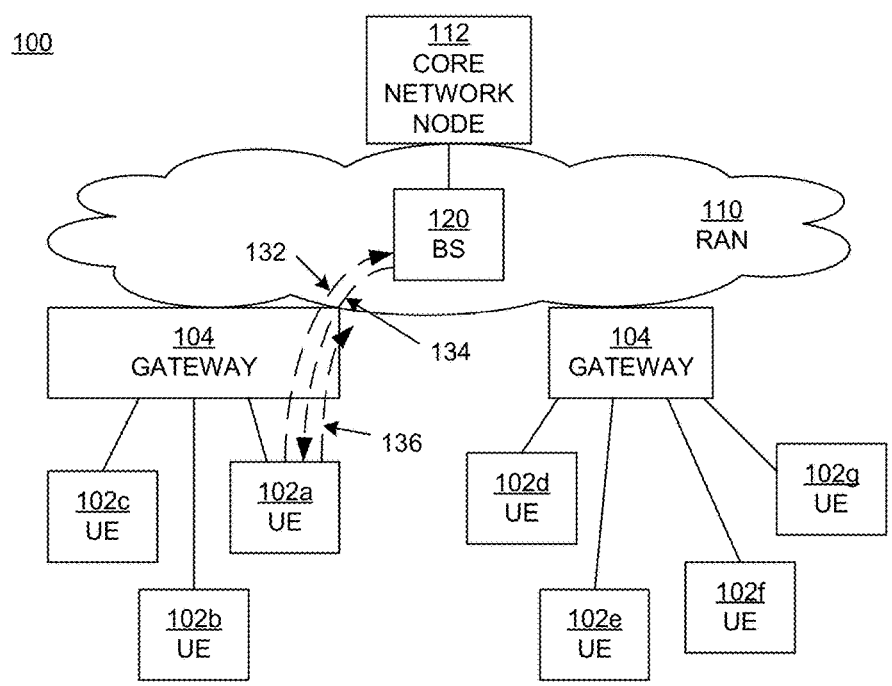
FIG. 1 is a block diagram of an example of a machine-to-machine (M2M) network upon which embodiments according to the present disclosure can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "communicating," "transmitting," "waiting," "detecting," "receiving," "selecting," "mapping," "changing," "reassigning," "identifying," "sending," "reserving," "accessing," or the like, refer to actions and processes (e.g., flowcharts 300, 400, and 500 of FIGS. 3, 4, and 5, respectively) of a computer system or similar electronic computing device or processor (e.g., systems 120 and 102a of FIGS. 6 and 7, respectively). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a machine-to-machine (M2M) network 100 upon which embodiments according to the present disclosure can be implemented. The network 100 includes a number of items or units of user equipment (UEs) 102a-102g (collectively referred to as UEs 102) that communicate in wireless and/or wired fashion to a radio access network (RAN) 110 through a number of gateways 104. The RAN 110 is connected to a core network (not shown) via a core network node 112.

Figure 7:
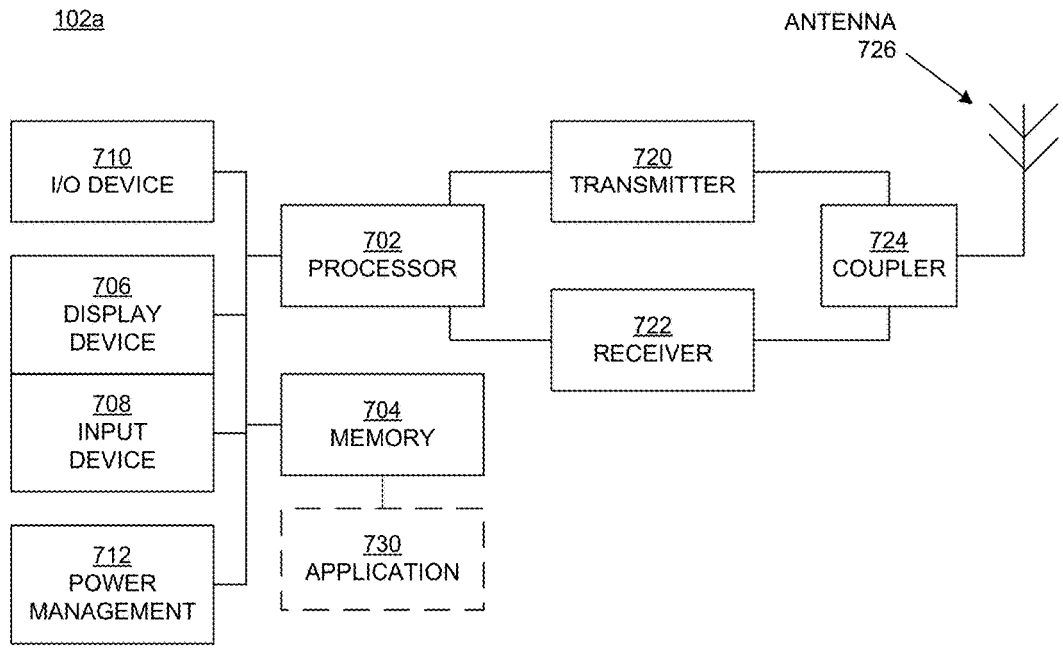
FIG. 7 is a block diagram showing elements of a UE upon which embodiments according to the present disclosure can be implemented.

The UEs 102 can be any type of device of various levels of complexity including devices such as, but not limited to, sensors, meters, and mobile phones (e.g., smartphones). An example of a UE is illustrated in FIG. 7. In an embodiment, the UEs can execute an application that allows them to perform operations (e.g., the operations of FIG. 4) according to the communication protocol fully described below.

The network 100 of FIG. 1 includes one or more base stations such as the base station (BS) 120. The BS 120 can be any type of device that can communicate in wireless and/or wired fashion to the UEs 102. An example of a BS is illustrated in FIG. 6. In an embodiment, the BS 120 can execute an application that allows it to perform operations (e.g., the operations of FIG. 5) according to the communication protocol described below.

In embodiments according to the present disclosure, the UEs 102 transmit contention signals (e.g., the contention signal 132) to the BS 120 during a contention period, receive confirmation signals (e.g., the confirmation signal 134) from the BS 120 before a data period begins, and transmit data signals (e.g., the data signal 136) to a receiving device (not shown) during the data period. The contention signals and confirmation signals do not significantly contribute to network load; each signal can be achieved using a single bit. A resource may be shared in the frequency, time, code, and/or space dimension. For example, a resource may be a time and frequency slot or block, in which each slot or block corresponds to a combination of an interval of time and a frequency or frequency range. A resource slot or block may also be referred to herein as a wireless communication resource. Resources in the contention period are referred to as contention resources and as confirmation resources, and resources in the data period are referred to as data resources. Generally speaking, contention resources and confirmation resources are smaller than data resources.

Figure 2:
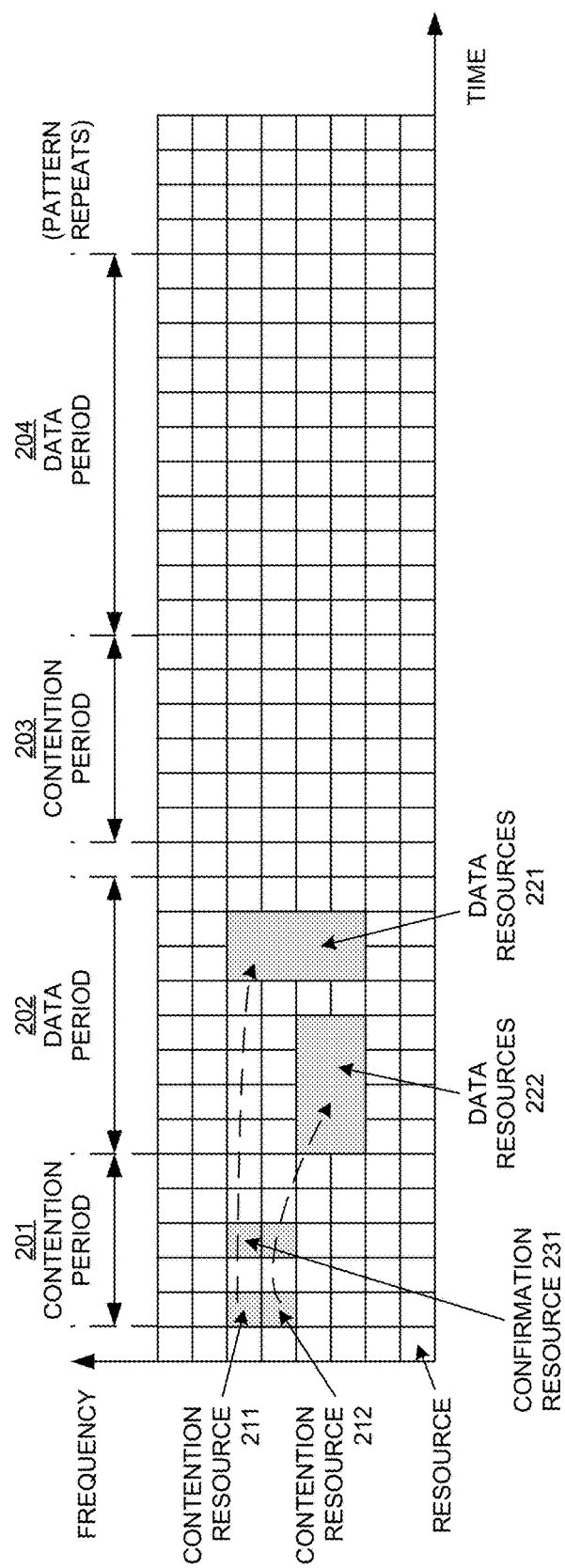
FIG. 2 is a diagram illustrating contention periods and data periods, and contention resources, confirmation resources, and data resources, in embodiments according to the present disclosure.

FIG. 2 is a diagram illustrating contention periods, data periods, contention resources, confirmation resources, and data resources, in embodiments according to the present disclosure. As noted above, a resource may be shared in the frequency, time, code, and/or space dimension. For example, resources can be implemented by spreading code over OFDMA (Orthogonal Frequency-Division Multiple Access), LDS (low density signature), or SCMA (Sparse Code Multiple Access); by spreading code on their own (e.g., Zadoff-Chu code); by spatial dimension (e.g., open-loop precoder); or some combination of these. A resource may include all of or part of a standard-sized resource block.

In the example of FIG. 2, a wireless communication resource slot or block is a time and frequency slot or block; each resource slot or block corresponds to a combination of an interval of time and a frequency or frequency range.

With reference also to FIG. 1, contention resources are used by the UEs 102 to contend for data resources. Confirmation resources are used by the BS 120 to confirm which UEs have been awarded particular data resources. Data resources are used by UEs 102 to transmit data.

Contention resources can be periodic, in which case the BS 120 always uses the same resources (e.g., frequencies; one skilled in the art will recognize that the time-related value of a resource will change) for contention, which repeat periodically. Contention resources can also be dynamic and the BS 120 can announce which resources are to be used for contention by broadcasting information to the UEs 102 to identify the contention resources or by unicasting that information to each UE.

To achieve high data frame utilization, the data resource assignment in each period may be dynamic; in other words, the data resources may change from one data period to the next, for example, in which case the BS 120 selects resources that the UEs 102 will use for transmitting data. Alternatively, the data resources may be periodic, in which case the same data resources (e.g., frequencies) are used from one data period to the next.

Contention resources may include a time guard band to deal with synchronization between the UEs 102 and the BS 120. For instance, if a UE wakes up after a long sleep cycle, its clock may be out of sync with the BS's clock. If its clock is sufficiently out of sync, the UE might believe it is in a contention period when in reality it is in a data period. The guard band addresses this issue and helps ensure that multiple UEs with different timing offsets can transmit contention signals without colliding with data signals. Other mechanisms can be used to address this issue. For example, after waking up, a UE may listen until it acquires a rough synchronization with the BS. Then, the UE may contact the BS, which can respond with timing information for finer synchronization.

If the contention and/or data resources are dynamic, then the BS can adjust the number of contention resources from one contention period to the next, and/or can adjust the number of data resources from one data period to the next. Similarly, the length of a contention period can be adjusted from one period to the next, and the length of a data period can be adjusted from one period to the next. For example, the BS 120 can measure the number of collisions in one contention period, and increase or decrease the number of contention resources in the next contention period accordingly, or increase or decrease the length of the next contention period accordingly. Also, UEs can measure and report access delays, and the BS can increase or decrease the number of resources or the length of the periods depending on the number and/or length of the delays. In general, in an embodiment, the number of resources and/or the length of each period can be adjusted according to the load on the network 100 or the RAN 110.

If a contention resource is not won by any UE (e.g., due to collision, or due to no offered load), then the BS may reassign that resource for other types of traffic (e.g., other than M2M traffic), more urgent traffic, or scheduled transmissions. If a contention resource is not won by any UE (due to collision, or due to no offered load), then the BS may choose to shorten the data period and/or announce the next contention period sooner. It should be noted that it is not necessary for a BS to award a data resource even if a UE successfully contends for it. A BS may preempt UE usage of data resources for other purposes by simply not sending a confirmation signal.

In the example of FIG. 2, a contention period is followed by a data period, which is followed by another contention period and another data period in turn, and so on. Contention resources in the first contention period 201 are mapped to data resources in the first data period 202, contention resources in the second contention period 203 are mapped to data resources in the second data period 204, and so on. For example, the contention resource 211 is mapped to the data resources 221, and the contention resource 212 is mapped to the data resources 222. Each data resource can consist of one or more blocks or slots as shown in the example of FIG. 2.

The mapping of contention resources to data resources may be one-to-one or many-to-one. In a one-to-one mapping, one contention resource is mapped to one data resource. In a many-to-one mapping, multiple contention resources are mapped to one data resource. Each data resource can consist of one or more blocks or slots as shown in the example of FIG. 2. A many-to-one mapping may improve performance relative to a one-to-one mapping because data resources can be more efficiently utilized and unmapped resources in the data period can be used for other types of traffic. In the unlikely event that more than one UE is awarded the same data resource (e.g., if two UEs successfully transmit contention signals using different contention resources that map to the same data resource), the BS 120 can arbitrate. A one-to-one mapping may improve performance relative to a many-to-one mapping by reducing the possibility of collisions in the data period.

The table below is an example of contention resource-to-data resource mapping in an embodiment according to the present disclosure ("t" refers to time, and "f" is frequency of a boundary of the frequency band).

| Contention Index | Start Frequency | End Frequency | Start Time | End Time | Start Code | End Code |
|---|---|---|---|---|---|---|
| 0 | $f_1$ | $f_2$ | $t_1$ | $t_2$ | NaN | NaN |
| 1 | $f_1$ | $f_2$ | $t_3$ | $t_5$ | 1 | 1 |

In an embodiment, the BS 120 announces the mapping of contention resources to data resources on a periodic basis. The BS 120 can announce the mappings by broadcasting information about the mappings to the UEs 102, or it can unicast that information to each UE. The BS 120 can announce mappings at any rate; the rate at which mappings are announced can be different from the rate of recurrence of the contention and data periods (e.g., the BS can announce mappings once per day, while there may be several contention and data periods per day). In other embodiments, a network operator, for example, can install the M2M devices with a priori knowledge of the mapping that the BS 120 will use, or the resources may be static, and so a mapping announcement doesn't need to be transmitted over the air. One skilled in the art will recognize that in such embodiments the mappings will be fixed unless all deployed devices (UEs and BSs) can be updated.

The mapping of contention resources to data resources can be different from one set of periods (one frame) to the next. For instance, in the example of FIG. 2, the mapping of contention resources to data resources in periods 203 and 204 may be the same as or different from the mapping in periods 201 and 202 (in terms of frequency, since clearly the time intervals will be different).

As mentioned above, contention resources may be dynamic or they may be static, and data resources may be dynamic or they may be static. In an implementation in which both contention resources and data resources are static, information identifying the contention resources, the data resources, and the mapping of contention resources to data resources can be installed on UEs (and perhaps BSs as well) a priori or such information can be sent from the BS to a UE when the UE is initialized. In other implementations, either one or both of the contention resources and the data resources may be dynamic, in which case the mappings will be dynamic. In these latter implementations, any static information can be installed a priori on UEs (and perhaps BSs, too) or sent to a UE when the UE is initialized, and any dynamic information can be announced (e.g., broadcast or unicast) as described above.

Figure 3:
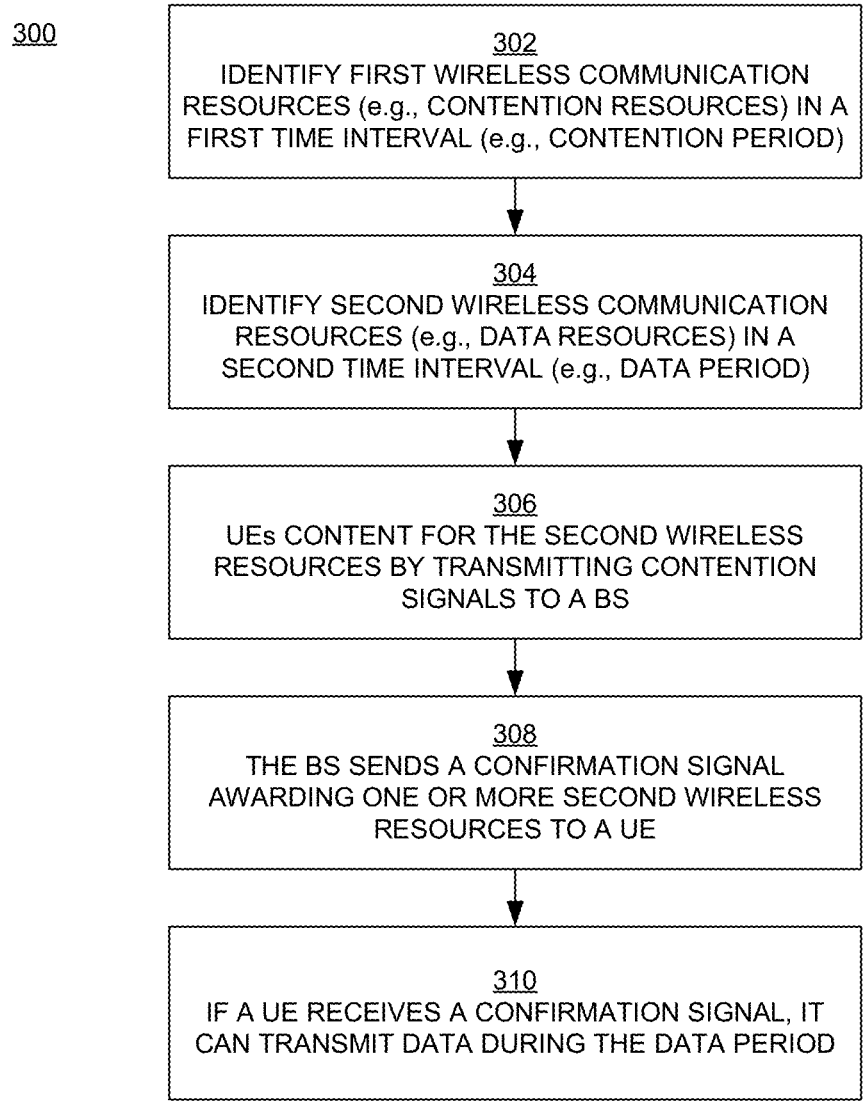
FIG. 3 is a flowchart of an example of operations performed by UEs or by a BS in an embodiment according to the present disclosure.

FIG. 3 is a flowchart 300 of an example of operations performed by UEs and/or by a BS in an embodiment according to the present disclosure. FIG. 3 is discussed with reference also to FIGS. 1 and 2.

In overview, a UE transmits a contention signal using a contention resource. If the signal is successfully received by the BS (e.g., because no other UE used the same contention resource), then the UE may receive a response to that signal. Receiving a response from the BS is confirmation to the UE that it is being awarded the data resource corresponding to the contention resource. The UE can then transmit data using that data resource. On the other hand, if for example multiple UEs are using the same contention resource, then a collision will occur and no UE will receive a response from the BS, thereby indicating to each contending UE that it does not have transmission rights in the corresponding data resource in the following data period. In this case, the UEs can optionally repeat the process using a different contention resource (in the same contention period or in a subsequent one).

In block 302 of FIG. 3, a number of first wireless communication resources (e.g., contention resources) in a first time interval (e.g., the contention period 201) are identified. More specifically, in an embodiment (e.g., if the contention resources are dynamic as discussed above), the BS 120 can identify a set of contention resources that are available in a contention period (e.g., the contention period 201) and then reserve that set. The BS 120 can announce the set of available contention resources (e.g., by broadcasting information about the resources to the UEs 102, or by unicasting that information to each UE). In another embodiment (e.g., if the contention resources are static as discussed above), information about the available contention resources may be installed on the UEs a priori by the manufacturer or at some subsequent point such as when the UEs are initialized. In any case, the UEs can access information to identify the set of available contention resources.

In block 304, a mapping between a number of second wireless communication resources (e.g., data resources) in a second time interval (e.g., the data period 202) and the first wireless communication resources (contention resources) is identified. More specifically, in an embodiment (e.g., if the data resources are dynamic as discussed above), the BS 120 can identify a set of data resources that are available in a data period and then can generate a mapping of the contention resources to the data resources. The BS 120 can then announce the mapping to the UEs 102 (e.g., by broadcast or unicast). In another embodiment (e.g., if the data resources are static as discussed above), information about the mapping may be installed on the UEs a priori or when the UEs are initialized. In any case, the UEs can then access the information to identify the mapping.

In block 306, UEs contend for the second wireless communication resources (data resources) by transmitting contention signals to a BS using the first wireless communication resources (contention resources).

In block 308, the BS sends a confirmation signal to a UE if it successfully receives a contention signal from that UE. As used herein, a contention signal that is successfully received by the BS is one that does not collide with another signal, specifically another contention signal from another UE (conversely, contention signals that collide are characterized herein as not being able to be successfully received). The UE that receives the confirmation signal is awarded one or more of the second wireless communication resources (data resources). The one or more second wireless communication resources awarded to the UE are mapped from the wireless communication resource used by the UE to transmit the contention signal. Because the contention, confirmation and data resources form a unique triplet, receiving the acknowledgement of the contention request uniquely identifies the awarded resource.

For example, in an embodiment, the UE 102a selects the contention resource 211 and attempts to send a contention signal 132 using that contention resource. If the UE 102a is the only UE attempting to use the contention resource 211, then the UE 102a will be able to successfully send the contention signal 132. In response to receipt of the signal 133, the BS 120 will transmit a confirmation signal 134 to the UE 102 using the confirmation resource 231. In other words, the receipt of the confirmation signal 134 indicates to the UE 102a that it has won the data resource (e.g., the data resources 221) corresponding to the contention resource 211 that was used by the UE. The confirmation signal may be unicast or broadcast.

As noted earlier, the BS 120 may decide not to send a confirmation signal, even if a UE has used a contention resource to send a contention signal that was successfully received by the BS. For example, the BS 120 may decide not to award data resources to the UE if the load on the network 100 or the RAN 110 is high; instead, the BS may reserve the data resources for other types of traffic (e.g., other than M2M traffic), more urgent traffic, or scheduled transmissions.

In an embodiment, the confirmation signal 134 contains information that specifically identifies the UE 102a (e.g., the UE's identifier (ID)). The confirmation signal 134 can also include a channel quality indication (CQI); however, a CQI is not necessary if the UEs are to use blind detection with a prion MCS (modulation and coding scheme). The confirmation signal 134 can also include information identifying which data resources are to be used; however, this type of information is not necessary if, for example, the BS 120 announces a mapping of contention resources to data resources on a periodic basis as mentioned above. The confirmation signal 134 can also include a timing advance to remove, if need be, a guard band from the data resources.

In block 310 of FIG. 3, if the UE received a confirmation signal from the BS 120, then it can transmit data in the data period. In the example presented above, the UE 102a can send data using the data resources 221.

More specifically, as noted above, the contention resource 211 is mapped to the data resources 221. Because the UE 102a has received the confirmation signal 134 from the BS 120, it recognizes that it can transmit its data using the data resources 221. In this manner, the UE 102a is effectively granted a reservation for the data resources 221. Viewed from another perspective, each data resource is mapped to a contention resource; a UE learns that it can use a data resource if it is able to use the contention resource associated with that data resource; and the UE learns it was able to use the contention resource because it receives a confirmation signal in response to its contention signal.

On the other hand, if multiple UEs select the same contention resource 211 and attempt to use it, a collision will occur. Because the BS 120 is not typically able to property decode the overlapping UE contention signals, if the BS cannot identify a contending UE, then it cannot respond with a confirmation signal. Accordingly, no confirmation signal is sent and none of the contending UEs is granted a reservation for the data resource, hence avoiding collisions in the data period 202.

Figure 4:
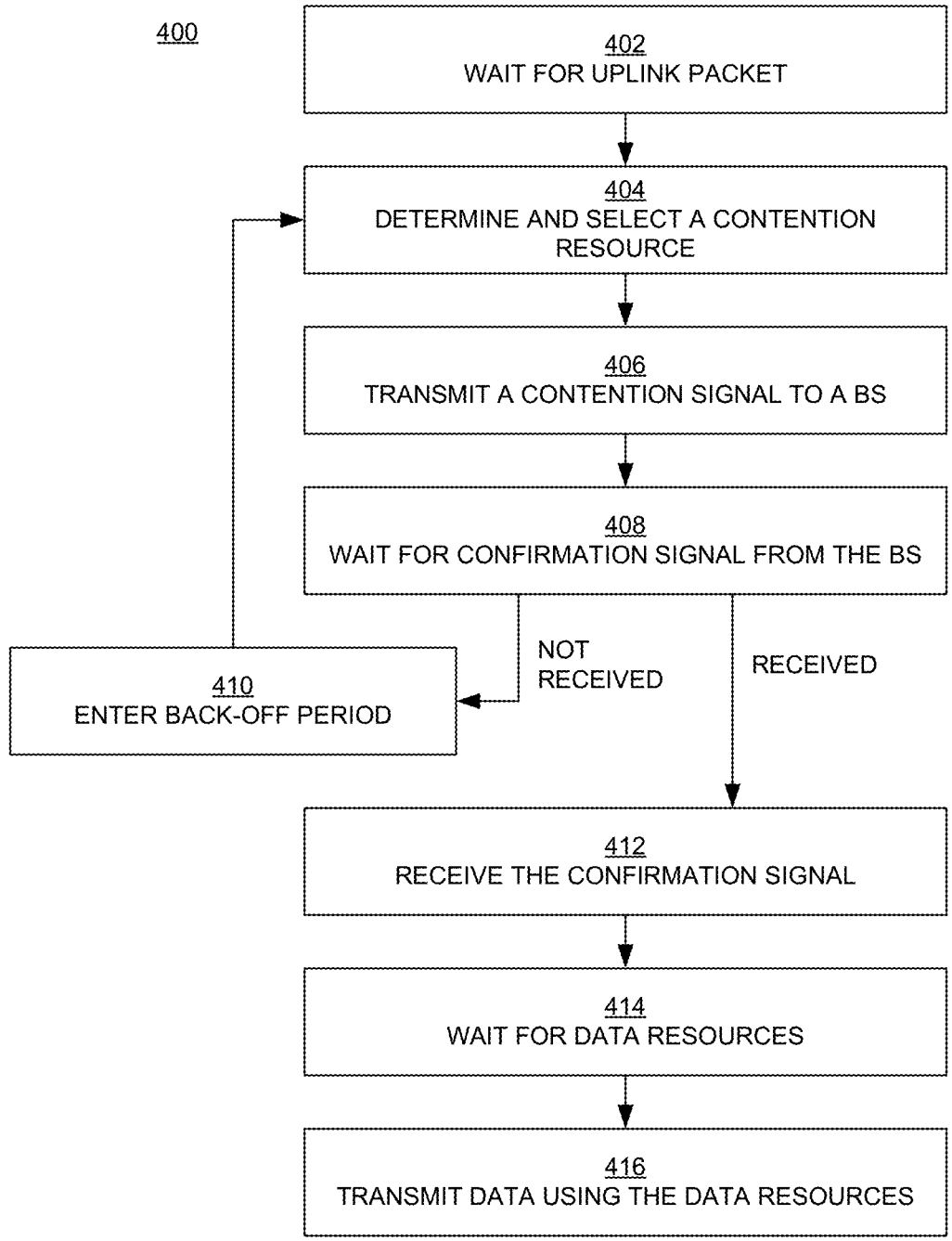
FIG. 4 is a flowchart of an example of operations performed by a UE in an embodiment according to the present disclosure.

FIG. 4 is a flowchart 400 of an example of operations performed by a UE (e.g., one of the UEs 102 of FIG. 1) in an embodiment according to the present disclosure. FIG. 4 is discussed with reference to FIGS. 1 and 2.

In block 402, a UE (e.g., the UE 102a) is waiting for an uplink packet, which indicates that the UE has data to transmit. In response to detecting an uplink packet, the flowchart proceeds to the next operation.

In block 404, in an embodiment, the UE 102a selects a contention resource (a resource such as the contention resource 211 in the contention period 201). The contention resources may be known a priori by the UE or they may be announced by the BS 120 as previously described herein. The UE may select a contention resource at random, or it may select one of the contention resources based on channel status, for example. In another embodiment, the UE is assigned a single contention resource when it is manufactured or initialized, for example, in which case the UE need not select a contention resource and instead uses the preselected resource.

In block 406, the UE 102*a* transmits a contention signal 132 to the BS 120 using a contention resource (e.g., the contention resource 211). As mentioned above, the contention signal may be transmitted without two-way synchronization between the UE and the BS 120. Alternatively, the UE may listen until it can acquire rough synchronization, and the BS may then subsequently provide timing information for finer synchronization.

In block 408, the UE 102*a* waits to receive a confirmation signal 134 from the BS 120. Once the contention signal 132 is sent, the UE 102*a* can, in one embodiment, start a timer; if the timer expires before a confirmation signal is received, then the UE 102*a* can determine that it did not win transmission rights in the corresponding data period. If a confirmation signal is not detected or received, then the UE 102*a* can use a future contention period. In some embodiments, the UE 102*a* may utilize a back-off timer and enter a back-off period (block 410), and after the end of the back-off period it can then send another contention signal using another contention resource (blocks 404 and 406). In other words, if a confirmation signal is not received, then the UE 102*a* can wait, then send another contention signal. The UE 102*a* can attempt to send a contention signal more than once before the contention period 201 expires. That is, the UE 102*a* can send a first contention signal during the contention period 201; if a confirmation signal is not detected or received in response to the first contention signal, a second such signal can be sent during the contention period 201, and so on until either a confirmation signal is received or the contention period expires.

In block 412, a confirmation signal is received by the UE 102*a*. If a confirmation signal is not received by the UE 102*a*, then the UE will not transmit data during the following data period 202.

In block 414, the UE 102*a* waits for the beginning of the data period 202; specifically, the UE waits for the start of the data resources 221 (which are mapped from the contention resource 211 by the UE). That is, the data resources 221 have a time element as well as, for example, a frequency element, and so the UE 102*a* will wait for the time associated with the data resources to begin.

In block 416, the UE 102*a* can begin transmitting data using the data resources 221.

Figure 5:
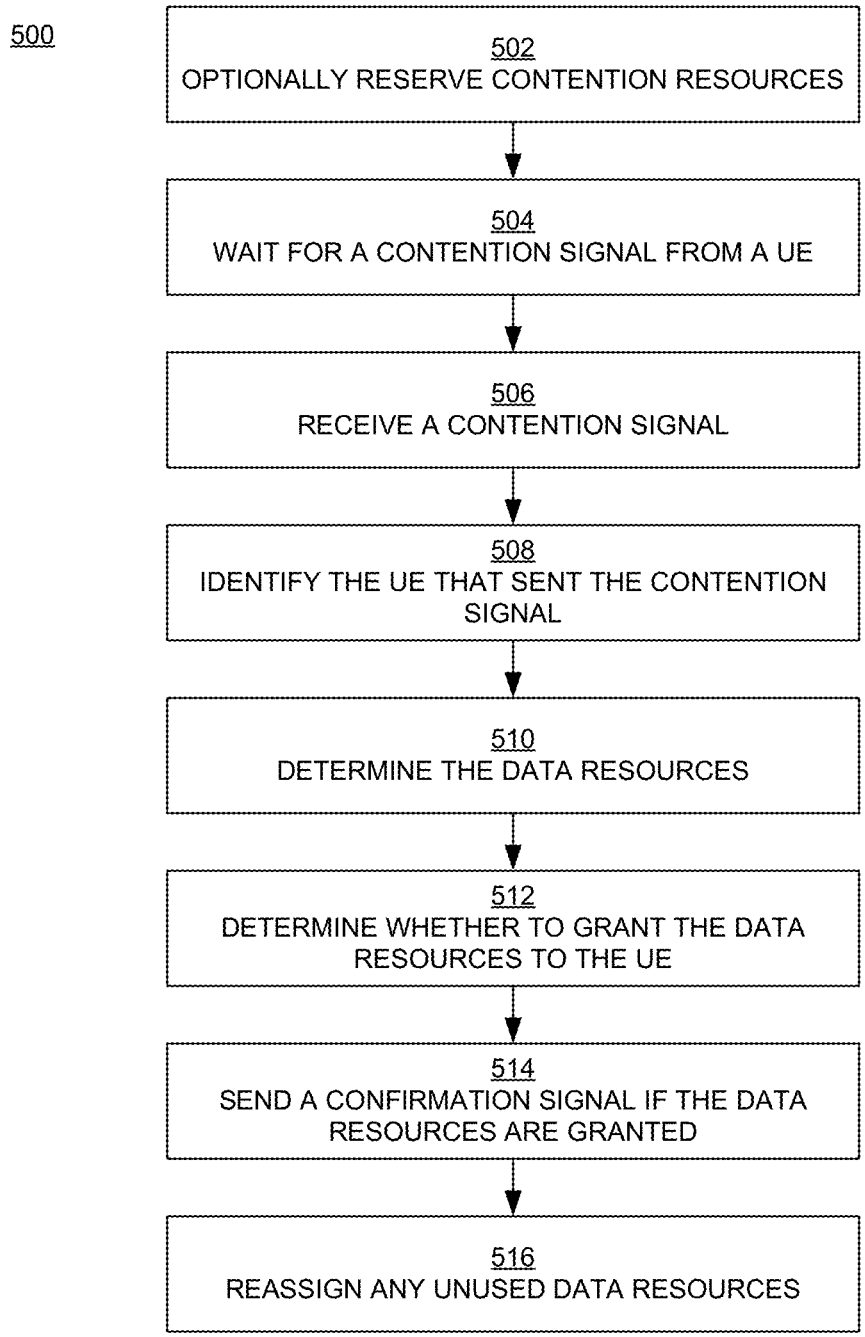
FIG. 5 is a flowchart of an example of operations performed by a BS in an embodiment according to the present disclosure.
Figure 6:
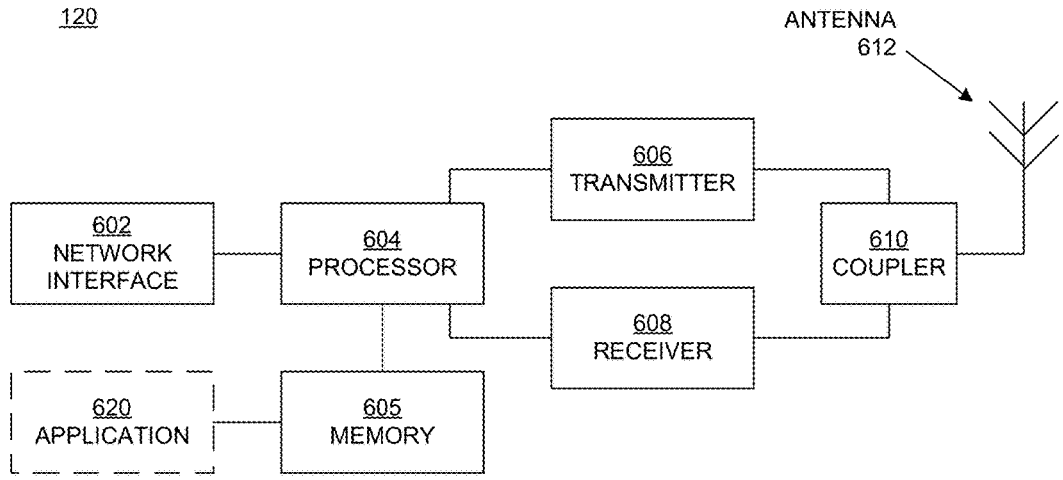
FIG. 6 is a block diagram showing elements of a BS upon which embodiments according to the present disclosure can be implemented.

FIG. 5 is a flowchart 500 of an example of operations performed by a BS (e.g., the BS 120 of FIG. 1) in an embodiment according to the present disclosure. FIG. 5 is discussed with reference to FIGS. 1 and 2.

In block 502, the BS 120 can optionally reserve contention resources in a contention period (e.g., the contention period 201). In an embodiment, the BS 120 can announce the contention resources by broadcasting them to the UEs 102, or it can unicast that information to each UE. Unused resources in the contention period 201 can be made available to other traffic. In an embodiment, the M2M devices are installed or initialized with the contention resources that the BS 120 will use, and so the contention resources may not be announced in an over-the-air transmission.

In block 504, the BS 120 waits to receive a contention signal from a UE.

In block 506, the BS 120 receives a contention signal.

In block 508, the BS 120 identifies the UE that sent the contention signal that was received in block 506 (e.g., the UE 102*a*). The ID of the UE may be included in the contention signal. Alternatively, the ID of the UE may be derived. For example, if contention resources are reserved per UE (if a particular contention resource is assigned a priori to a particular UE), then the BS can identify the UE based on the contention resource used for the contention signal. As another alternative, the ID can be embedded in the contention resource with ID-specific scrambling.

As noted previously herein, the contention resources can be mapped to the data resources (e.g., a one-to-one mapping between contention and data resources). Hence, in block 510, the BS 120 uses the mapping to determine which data resources are to be used by the UE from which the contention signal was received (e.g., by the UE 102*a*). Alternatively, the BS may select data resources from an existing pool of resources or may select data resources based on the signal strength of the contention signal.

In block 512, the BS 120 determines whether the UE 102*a* should be granted the data resources identified in block 510. For example, as mentioned above, there may be a many-to-one mapping of contention resources to data resources, in which case the BS may arbitrate which UE should be granted the data resources if multiple UEs use contention resources that are mapped to the identified data resources. Also, as mentioned above, the BS may decide not to grant the data resources based on the load on the network 100 or RAN 110, and instead may allocate the data resources to other traffic.

If, in block 512, the BS 120 determines that the data resources identified in block 510 should be granted to the UE 102*a* then, in block 514, the BS 120 sends a confirmation signal to the UE 102*a* (e.g., the confirmation signal 134 is unicast to UE 102*a*). Alternatively, the BS may broadcast the confirmation signal to all of the UEs 102, in which case the confirmation signal would indicate which of the UEs is awarded the data resources identified in block 510.

In block 516, the BS 120 can reassign any unused (e.g., unclaimed or not awarded) data resources in the data period 202.

FIG. 6 is a block diagram showing elements of a BS (e.g., the BS 120) upon which embodiments according to the present disclosure can be implemented. In the example of FIG. 8, the BS 120 includes a processor 604 coupled to a memory 605. In one embodiment, the BS 120 includes a network interface 602. A transmitter 606 and receiver 608 are coupled to an antenna 612 via a coupler 610. Alternatively, the transmitter 606 and receiver 608 may be implemented as a transceiver. Many other devices or subsystems may be connected to or included with the BS 120.

The BS 120 can execute an application 620 that allows it to perform operations (e.g., the operations of FIG. 5). A computer program containing the application 620 may be loaded into the BS 120. For example, all or a portion of the computer program stored on a computer-readable medium may be stored in the memory 605. When executed by the processor 604, the computer program can cause the processor to perform and/or be a means for performing the functions of the example embodiments described and/or illustrated herein. Additionally or alternatively, the example embodiments described and/or illustrated herein may be implemented in firmware and/or hardware.

FIG. 7 is a block diagram showing elements of a UE (e.g., one of the UEs 102, e.g., UE 102*a*) upon which embodiments according to the present disclosure can be implemented. In its most basic configuration, the UE 102*a* may include at least one processor 702 and at least one memory 704.

The UE 102*a* may also include a display device 706 that is generally configured to display a graphical user interface (GUI). The UE 102*a* may also include an input device 708, which may include a touch sensing device (a touch screen).

The transmitter 720 and receiver 722 are coupled to an antenna 726 via a coupler 724. Alternatively, the transmitter 720 and receiver 722 may be implemented as a transceiver.

The UE 102*a* may also include at least one input/output (110) device 710, such as a keyboard. The UE 102*a* may include a power management subsystem 712, including a battery.

Many other devices or subsystems may be connected to or included with the UE 102*a*. Conversely, all of the components and devices illustrated in FIG. 7 need not be present to practice the embodiments described herein.

The UE 102*a* can execute an application 730 that allows it to perform operations (e.g., the operations of FIG. 4). A computer program containing the application 730 may be loaded into the UE 102*a*. For example, all or a portion of the computer program stored on a computer-readable medium may be stored in the memory 704. When executed by the processor 702, the computer program can cause the processor to perform and/or be a means for performing the functions of the example embodiments described and/or illustrated herein. Additionally or alternatively, the example embodiments described and/or illustrated herein may be implemented in firmware and/or hardware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

In summary, embodiments according to the present disclosure provide a two-phase random access, or contention-based, protocol. Contention resources and data resources can be linked through a mapping announced by a BS. The period and/or duration of the phases can be adjusted according to network load. Resources can be reassigned to other types of traffic (other than M2M traffic) depending on network load. Unused data resources can be readily identified and reassigned to other types of traffic.

Overall, embodiments according to the present disclosure increase network efficiency. The protocol described herein is well-suited for M2M networks, which experience sporadic traffic so that channel measurements and fairness are of lesser importance. Nevertheless, satisfactory fairness can be achieved with a good selection for the back-off timer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A device, comprising:
a non-transitory memory storage comprising instructions; and
one or more processors in communication with the memory, wherein the one or more processors execute the instructions to;
transmit a first signal to a base station before a first time interval expires, the first signal transmitted in a first wireless communication resource slot in the first time interval, the first wireless communication resource slot mapped to a second wireless communication resource slot in a second time interval that begins after the first time interval expires, the mapping of the first wireless communication resource slot to the second wireless communication resource slot being a priori information to both the device and the base station before transmission of the first signal, and transmission of the first signal in the first wireless communication resource slot in the first time interval solely indicating a specific resource request for the second wireless communication resource slot in the second time interval; and
receive a second signal from the base station indicating that the device has been awarded the second wireless communication resource slot and can transmit data in the second wireless communication resource slot in the second time interval.

2. The device of claim 1, wherein the one or more processors further execute the instructions to receive the second signal from the base station in an over-the-air transmission.

3. The device of claim 1, wherein if the second signal is not received by the device before a timer expires during the first time interval, then the one or more processors further execute the instructions to transmit a third signal before the first time interval expires, the third signal transmitted in a third wireless communication resource slot in the first time interval, the third wireless communication resource slot mapped to a fourth wireless communication resource slot in the second time interval; and
wherein further the one or more processors further execute the instructions to receive a fourth signal indicating that the device has been awarded the fourth wireless communication resource slot and can transmit data in the fourth wireless communication resource slot in the second time interval.

4. The device of claim 1, wherein the one or more processors further execute the instructions to receive, from the base station, a mapping of wireless communication resource slots in the first time interval to wireless communication resource slots in the second time interval.

5. The device of claim 1, wherein the one or more processors further execute the instructions to receive, from the base station, information identifying a plurality of wireless communication resource slots in the first time interval, including the first wireless communication resource slot.

6. The device of claim 1, wherein the first wireless communication resource slot is selected from a plurality of wireless communication resource slots, wherein selection of the first wireless communication resource slot is random or according to channel status.

7. The device of claim 1, wherein the device and the base station comprise parts of a machine-to-machine network.

8. A base station comprising:
a non-transitory memory storage comprising instructions; and
one or more processors in communication with the memory, wherein the one or more processors execute the instructions to:
receive a first signal sent by a user equipment (UE) using a first wireless communication resource slot of a plurality of wireless communication resource slots that are included within a first time interval, wherein the first wireless communication resource slot is mapped to a second wireless communication resource slot in a second time interval that begins after the first time interval ends, the mapping of the first wireless communication resource slot to the second wireless communication resource slot being a priori information to both the base station and the UE before reception of the first signal, and reception of the first signal in the first wireless communication resource slot in the first time interval solely indicating a specific resource request from the UE for the second wireless communication resource slot in the second time interval; and
transmit a second signal to the UE in response to receipt of the first signal, the second signal indicating award of the second wireless communication resource slot to the UE.

9. The base station of claim 8, wherein the one or more processors further execute the instructions to send the second signal to the UE in an over-the-air transmission.

10. The base station of claim 8, wherein the second signal comprises information identifying the UE that is awarded the second wireless communication resource slot.

11. The base station of claim 8, wherein the one or more processors further execute the instructions to:
map the first wireless communication resource slot to the second wireless communication resource slot; and
transmit the mapping to the UE.

12. The base station of claim 11, wherein the mapping is selected from the group consisting of: a one-to-one mapping of a wireless communication resource slot in the first time interval to a wireless communication resource slot in the second time interval; and a many-to-one mapping in which multiple wireless communication resource slots in the first time interval are mapped to a wireless communication resource slot in the second time interval.

13. The base station of claim 8, wherein the one or more processors further execute the instructions to:
select a length of the first time interval and a length of the second time interval; and
select a length of a third time interval that begins after the second time interval ends, wherein during the third time interval, items of user equipment send signals to the base station using wireless communication resource slots in the third time interval that are mapped to wireless communication resource slots in a fourth time interval that begins after the third time interval ends.

14. The base station of claim 13, wherein the one or more processors further execute the instructions to change a number of wireless communication resource slots in the third time interval relative to a number of wireless communication resource slots in the first time interval according to a measure of load on the wireless network.

15. The base station of claim 13, wherein the one or more processors further execute the instructions to change the length of the third time interval relative to the length of the first time interval according to a measure of load on the wireless network.

16. The base station of claim 13, wherein the one or more processors further execute the instructions to change a length of the fourth time interval relative to the length of the second time interval according to a measure of load on the wireless network.

17. The base station of claim 8, wherein the one or more processors further execute the instructions to reassign unused wireless communication resource slots to traffic outside the wireless network.

18. The base station of claim 8, wherein the one or more processors further execute the instructions to transmit synchronization information to the UE.

19. A method comprising:
accessing information that identifies a plurality of first wireless communication resource slots in a first contention period; and
accessing information that identifies a plurality of second wireless communication resource slots in a first data transmission period that begins after the first contention period ends, wherein the plurality of second wireless communication resource slots are mapped from the plurality of first wireless communication resource slots,
wherein during the first contention period: i) a user equipment (UE) contends for the plurality of second wireless communication resource slots by transmitting a contention signal to a base station using one of the plurality of first wireless communication resource slots, and ii) the UE receives a confirmation signal from the base station awarding one or more of the plurality of second wireless communication resource slots to the UE if the contention signal transmitted by the UE is successfully received at the base station, the one or more second wireless communication resource slots mapped from the wireless communication resource slot used by the UE to transmit the contention signal, the mapping of the wireless communication resource slot used by the UE to transmit the contention signal to the one or more second wireless communication resource slots being a priori information to both the base station and the UE before transmission of the contention signal, and using the wireless communication resource slot to transmit the contention signal in the first contention period indicating a specific resource request from the UE for the one or more second wireless communication resource slots in the first data transmission period.

20. The method of claim 19 wherein the confirmation signal comprises information identifying the UE.

21. The method of claim 19 wherein a second contention period begins after the first data transmission period ends, wherein a number of wireless communication resource slots in the second contention period is changed relative to the number of wireless communication resource slots in the first contention period.

22. The method of claim 21 wherein a second data transmission period begins after the second contention period ends, wherein a length of the second data transmission period is changed relative to a length of the first data transmission period.

* * * * *